(12) United States Patent
Juan et al.

(10) Patent No.: US 8,115,346 B2
(45) Date of Patent: Feb. 14, 2012

(54) ELECTRONIC DEVICE AND EXTERNAL POWER SUPPLY DEVICE CONTROL METHOD APPLICABLE THERETO

(75) Inventors: Kuan-Chi Juan, Taipei (TW); Chi-Nan Lu, Taipei (TW); Ruey-Ching Shyu, Taipei (TW)

(73) Assignee: Acer Incorporated, New Taipei (TW)

( * ) Notice: Subject to any disclaimer, the term of this patent is extended or adjusted under 35 U.S.C. 154(b) by 149 days.

(21) Appl. No.: 12/484,583

(22) Filed: Jun. 15, 2009

(65) Prior Publication Data

US 2010/0195356 A1   Aug. 5, 2010

(30) Foreign Application Priority Data

Feb. 3, 2009   (TW) ................................. 98103419 A

(51) Int. Cl.
*H01H 9/54* (2006.01)
(52) U.S. Cl. ....................................................... 307/140
(58) Field of Classification Search .................... 307/140
See application file for complete search history.

(56) References Cited

U.S. PATENT DOCUMENTS

| | | | | |
|---|---|---|---|---|
| 5,680,066 A | * | 10/1997 | Akioka et al. ................... | 327/78 |
| 6,330,175 B2 | * | 12/2001 | Shirato et al. ................... | 363/89 |
| 2002/0023235 A1 | | 2/2002 | Odaohhara | |
| 2005/0063725 A1 | * | 3/2005 | Matsukura ....................... | 399/88 |
| 2009/0206792 A1 | * | 8/2009 | Hyatt ............................ | 320/114 |

FOREIGN PATENT DOCUMENTS

| | | |
|---|---|---|
| JP | 2000112579 | 4/2000 |
| JP | 2007-189893 | 7/2007 |

OTHER PUBLICATIONS

"Search Report of European Counterpart Application", issued on Mar. 14, 2011, p. 1-p. 7.
"Office Action of Japan Counterpart Application", issued on Nov. 22, 2011, p1-p2, in which the listed reference was cited.

* cited by examiner

*Primary Examiner* — Robert L. Deberadinis
(74) *Attorney, Agent, or Firm* — Jianq Chyun IP Office

(57) ABSTRACT

An electronic device and an external power supply device control method applicable to the electronic device are disclosed. The electronic device is electrically connected to an external power supply device that is able to switch between an ON state and an OFF state. The electronic device includes a switch module and an internal power module. The switch module, when being triggered, generates a switch signal. The internal power module receives the switch signal and accordingly generates a trigger signal to the external power supply device, so that the external power supply device is triggered to switch from the OFF state to the ON state and accordingly supplies electric power to the electronic device.

20 Claims, 6 Drawing Sheets

ELECTRONIC DEVICE AND EXTERNAL POWER SUPPLY DEVICE CONTROL METHOD APPLICABLE THERETO

FIELD OF THE INVENTION

The present invention relates to an electronic device and an external power supply device control method applicable to the electronic device. More particularly, the present invention relates to an electronic device that is able to control an external power supply device connected thereto to switch from an OFF state to an ON state.

BACKGROUND OF THE INVENTION

With the rising sense of environmental protection, more and more consumers hope that power consumed by electronic devices can be further reduced. Most of the currently available electronic devices use a power supply device to supply electric power thereto. However, conventionally, when an electronic device is switched off or in a standby state, the power supply device still keeps supplying electric power to the electronic device which leads to unnecessary power consumption.

Currently, there is developed a power supply device that can be controlled to switch on or off. However, when an electronic device using such power supply device requires electric power, a user thereof must first switch on the power supply device and then turn on a switch of the electronic device. It is obvious inconvenient for the user to do so.

SUMMARY OF THE INVENTION

A primary object of the present invention is to provide an electronic device which is able to control the state of an external power supply device connected thereto, so that it is not necessary for a user to control two switches separately for the electronic device and the power supply device.

To achieve the above and other objects, the electronic device according to the present invention includes a switch module and an internal power module. The switch module generates a switch signal when it is triggered. The internal power module receives the switch signal and accordingly generates a trigger signal to an external power supply device electrically connected to the electronic device, so that the external power supply device is triggered to switch from an OFF state to an ON state and accordingly supplies electric power to the electronic device.

Another object of the present invention is to provide an external power supply device control method applicable to the electronic device of the present invention.

To achieve the above object, the external power supply device control method applicable to the electronic device of the present invention includes the following steps: (1) generating a switch signal. In this step, a switch module on the electronic device is triggered to thereby generate a switch signal; (2) providing a trigger signal. In this step, the internal power module receives the switch signal and accordingly generates a trigger signal to the external power supply device; and (3) supplying electric power. In this step, the external power supply device receives the trigger signal and is accordingly triggered to switch from an OFF state to an ON state for supplying electric power to the electronic device.

With the electronic device and the external power supply device control method according to the present invention, one or more of the following advantages can be provided:

(1) Power needed to trigger the external power supply device to the ON state can be supplied from the internal power module of the electronic device;
(2) The internal power module of the electronic device only consumes power within a level conversion section of the trigger signal;
(3) The electronic device is able to detect a remaining power level of the internal power module, and controls the ON/OFF state of the external power supply device according to whether the internal power module should be recharged or not; and
(4) The electronic device can also control the ON/OFF state of the external power supply device according to whether a network wake-up function is currently performed on the electronic device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
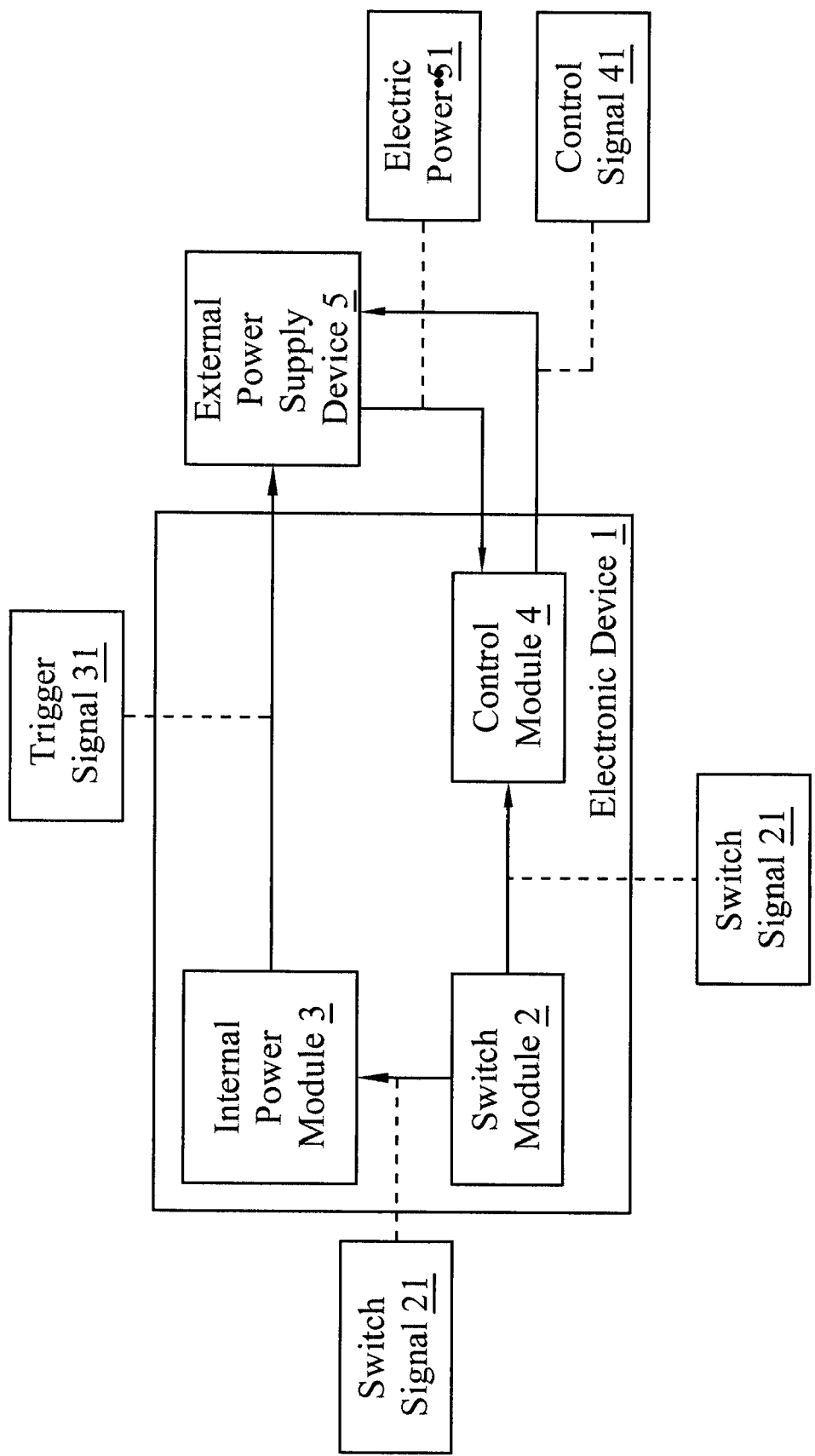
FIG. 1 is a system block diagram of an electronic device according to a first embodiment of the present invention.

Please refer to FIG. 1, which is a system block diagram of an electronic device 1 according to a first embodiment of the present invention. As shown, the electronic device 1 is electrically connected to an external power supply device 5, which can be switched between an ON state and an OFF state. The electronic device 1 includes a switch module 2, an internal power module 3, and a control module 4. The switch module 2 generates a switch signal 21 when it is triggered.

The internal power module 3 receives the switch signal 21 and accordingly generates a trigger signal 31 to the external power supply device 5, so that the external power supply device 5 is triggered to switch from the OFF state to the ON state for supplying electric power 51 to the electronic device 1.

The control module 4 receives the electric power 51 and the switch signal 21 to thereby generate a control signal 41 to the external power supply device 5, so as to control the ON/OFF state of the external power supply device 5.

In practical implementation, the electronic device 1 can be, for example, a portable computer, which is connected to the external power supply device 5 via a power cable, through which the electric power 51 is supplied. When a user intends to power on a newly purchased portable computer, he or she would find the external power supply device 5 therefor is in the OFF state and could not be used to supply power; meanwhile, a rechargeable battery for the portable computer is not charged. Under these circumstances, the electronic device 1 according to the present invention can utilize the internal power module 3 to supply the power needed to trigger the external power supply device 5. The internal power module 3 can be, for example, a lithium battery or a mercury battery. According to conventional techniques, the internal power module 3 is only used to supply power to a real-time clock (RTC). However, in the present invention, when the switch module 2 of the portable computer is triggered as a request for powering on, the switch module 2 would generate a switch signal 21 that includes a level conversion section. The internal power module 3 would, according to the switch signal 21, generate a trigger signal 31 having the same level conversion section as that of the switch signal 21 and the trigger signal 31 is sent to the external power supply device 5, so that the external power supply device 5 is triggered to switch from the OFF state to the ON state and supplies electric power 51 within the level conversion section to the electronic device 1. Finally, the control module 4, which can be, for example, an embedded controller (EC), can receive the electric power 51 supplied from the external power supply device 5 and generate a control signal 41 to the external power supply device 5 according to the switch signal 21 generated by the switch module 2, so that the external power supply device 5 is maintained at the ON state. Thereafter, the electronic device 1 can receive the electric power 51 and be powered on. Since the power-on of an electronic device is a technique known by a person having ordinary skill in the art, it is not discussed in details herein.

According to the above description, it is understood the internal power module 3 consumes power only within the level conversion section, and in all subsequent procedures, the control module 4 receives the electric power 51 supplied from the external power supply device 5 to generate the control signal 41 for controlling the ON/OFF state of the external power supply device 5. Therefore, the internal power module 3 is not subjected to the risk of becoming exhausted within a short time. In addition, when the rechargeable battery for the electronic device 1 is sufficiently charged, it is also possible for the rechargeable battery to supply the power needed to trigger the external power supply device 5 to switch from the OFF state to the ON state. The electronic device 1 can be electrically connected to the external power supply device 5 via a power cable or via wireless transmission, so as to transmit signals to and receive electric power 51 from the external power supply device 5.

Figure 2:
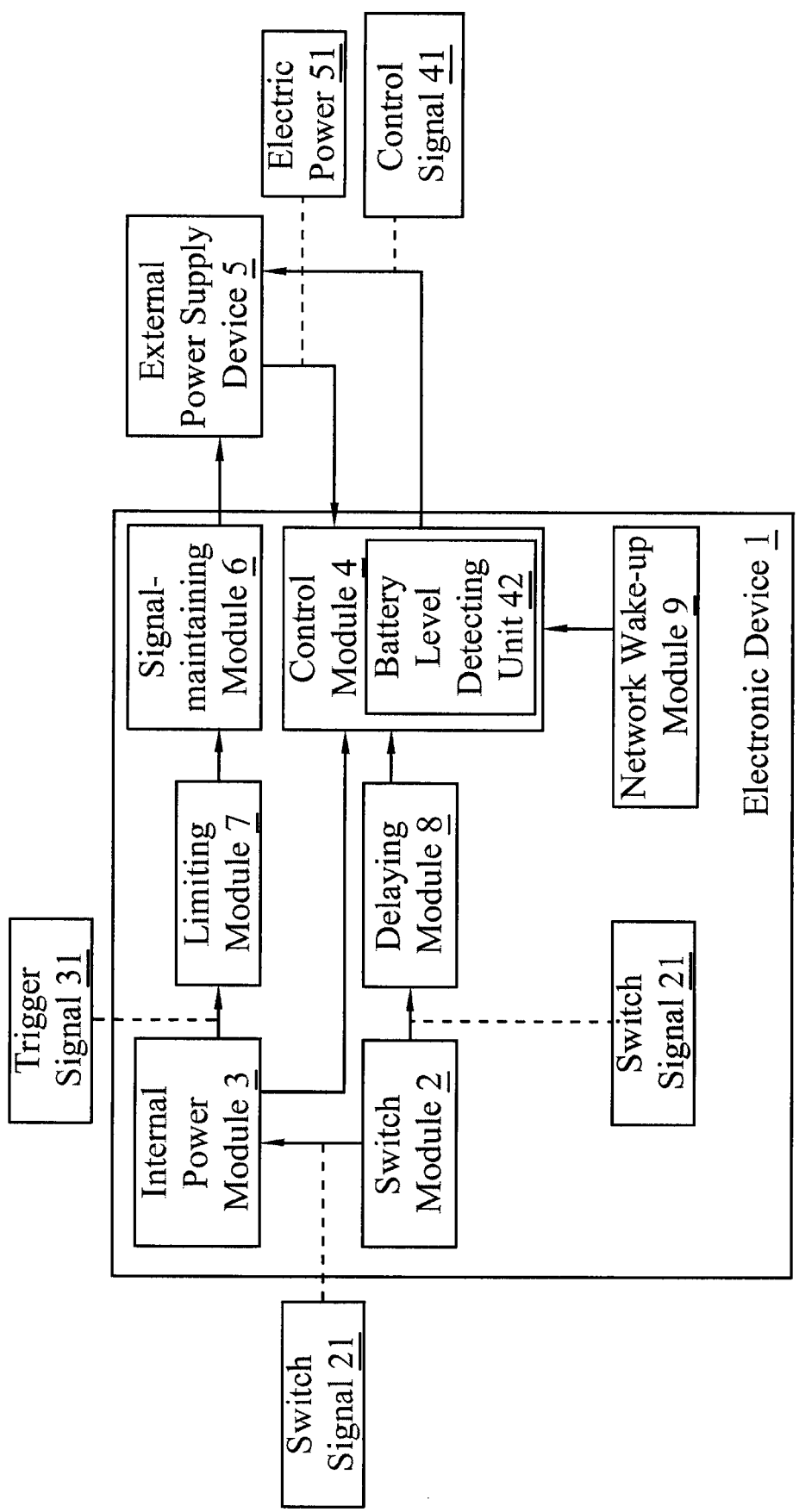
FIG. 2 is a system block diagram of an electronic device according to a second embodiment of the present invention.

Please refer to FIG. 2, which is a system block diagram of an electronic device 1 according to a second embodiment of the present invention. The second embodiment is different from the first embodiment in further including a signal-maintaining module 6, a limiting module 7, a delay module 8, a battery level detecting unit 42, and a network wake-up module 9. The signal-maintaining module 6 is electrically connected to and between the internal power module 3 and the external power supply device 5 for extending the level conversion section of the trigger signal 31.

The limiting module 7 is electrically connected to and between the internal power module 3 and the external power supply device 5 for lowering a signal level of the trigger signal 31. In fact, the internal power module 3 will send out a low-level trigger signal 31 even if it does not receive the switch signal 21. However, when the internal power module 3 receives the switch signal 21, it will send out a high-level trigger signal 31. By providing the limiting module 7, the low-level trigger signal 31 can be maintained at zero level, lest the low-level trigger signal 31 should trigger and switch on the external power supply device 5.

The delay module 8 is electrically connected to and between the switch module 2 and the control module 4 for receiving the switch signal 21. When the delay module 8 has received the switch signal 21 generated by the switch module 2, the received switch signal 21 is delayed by a predetermined period of time before it is sent to the control module 4.

As having been mentioned above, the control module 4 must first receive the electric power 51 supplied from the external power supply device 5 before it can generate the control signal 41 according to the switch signal 21. By providing the signal-maintaining module 6, the time for the trigger signal 31 to trigger the external power supply device 5 to supply the electric power 51 can be extended until the control module 4 generates the control signal 41 to control the external power supply device 5 to stably supply the electric power 51. And, by providing the delay module 8, the control module 4 can receive the electric power 51 first and then receives the switch signal 21.

The battery level detecting unit 42 is arranged in the control module 4. In the case the electronic device 1 is provided with a rechargeable battery, the battery level detecting unit 42 can periodically detect the remaining battery power of the internal power module 3 at predetermined intervals. The control module 4 can also control the external power supply device 5 to the ON state or the OFF state according to the detected remaining battery power and whether the battery should be recharged.

The network wake-up module 9 is electrically connected to the control module 4 and adapted to perform a network wake-up function, so that the electronic device 1 can receive a remote control signal transmitted from a remote location via a network and be turned on or off. The control module 4 can determine whether the network wake-up function is currently enabled. If yes, the control module 4 will control the external power supply device 5 to maintain at the ON state.

Figure 3:
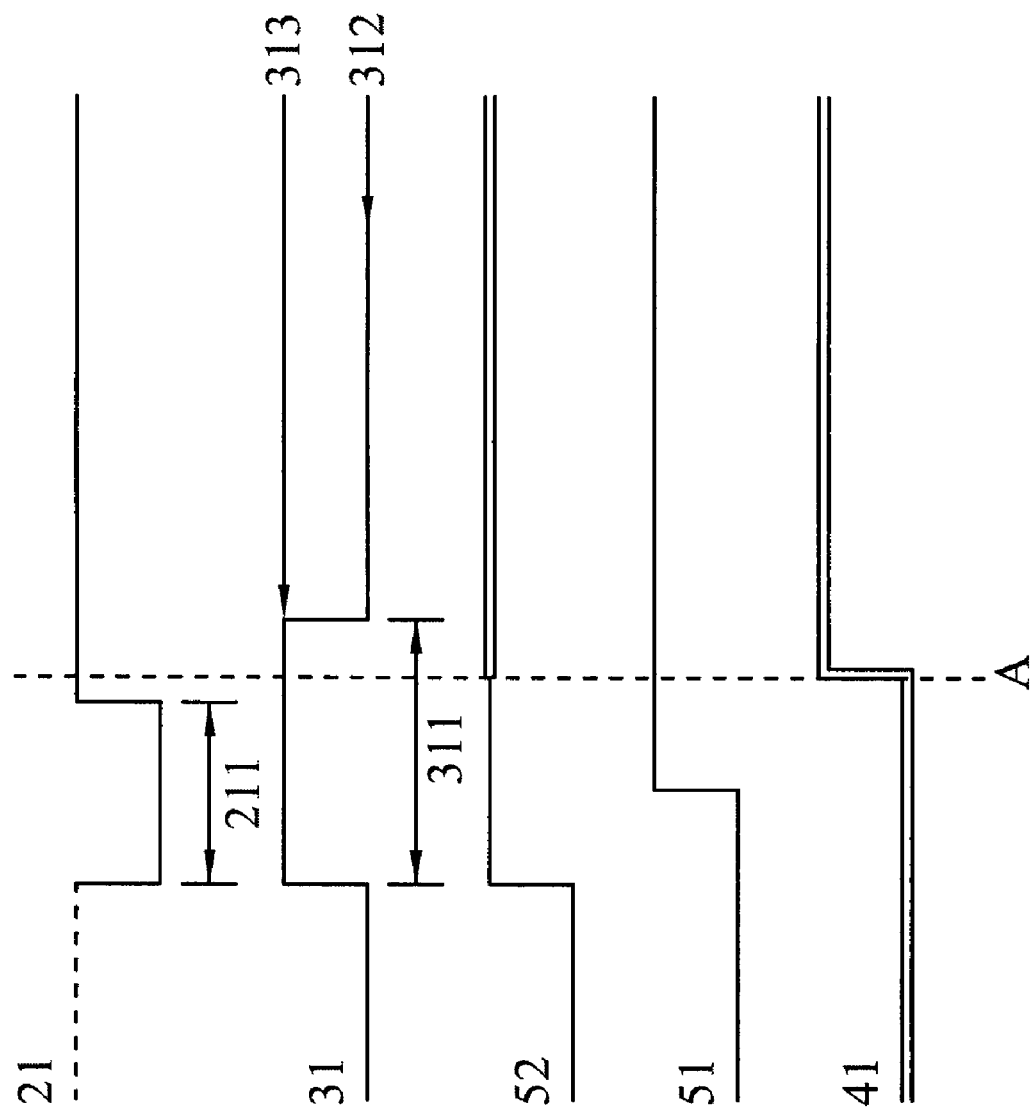
FIG. 3 shows the signal waveform of the electronic device of the present invention.

FIG. 3 shows a signal waveform of the electronic device 1 of the present invention. The level conversion section 311 of the trigger signal 31 is extended via the signal-maintaining module 6 and therefore becomes longer than the level conversion section 211 of the switch signal 21. When the trigger signal 31 is turned to a high level 313 from a low level 312, the state 52 of the external power supply device 5 is switched from the OFF state to the ON state at the same time. Then, the external power supply device 5 starts operating to supply the electric power 51 to the electronic device 1. However, the control module 4 will generate the control signal 41 to control the ON/OFF state of the external power supply device 5 only when it has received the electric power 51 and the switch signal 21 output via the delay module 8. As shown in FIG. 3, before the phantom line A, the external power supply device 5 is triggered according to the trigger signal 31 to supply electric power accordingly. However, after the phantom line A, the ON/OFF state of the external power supply device 5 is controlled according to the control signal 41.

Figure 4:
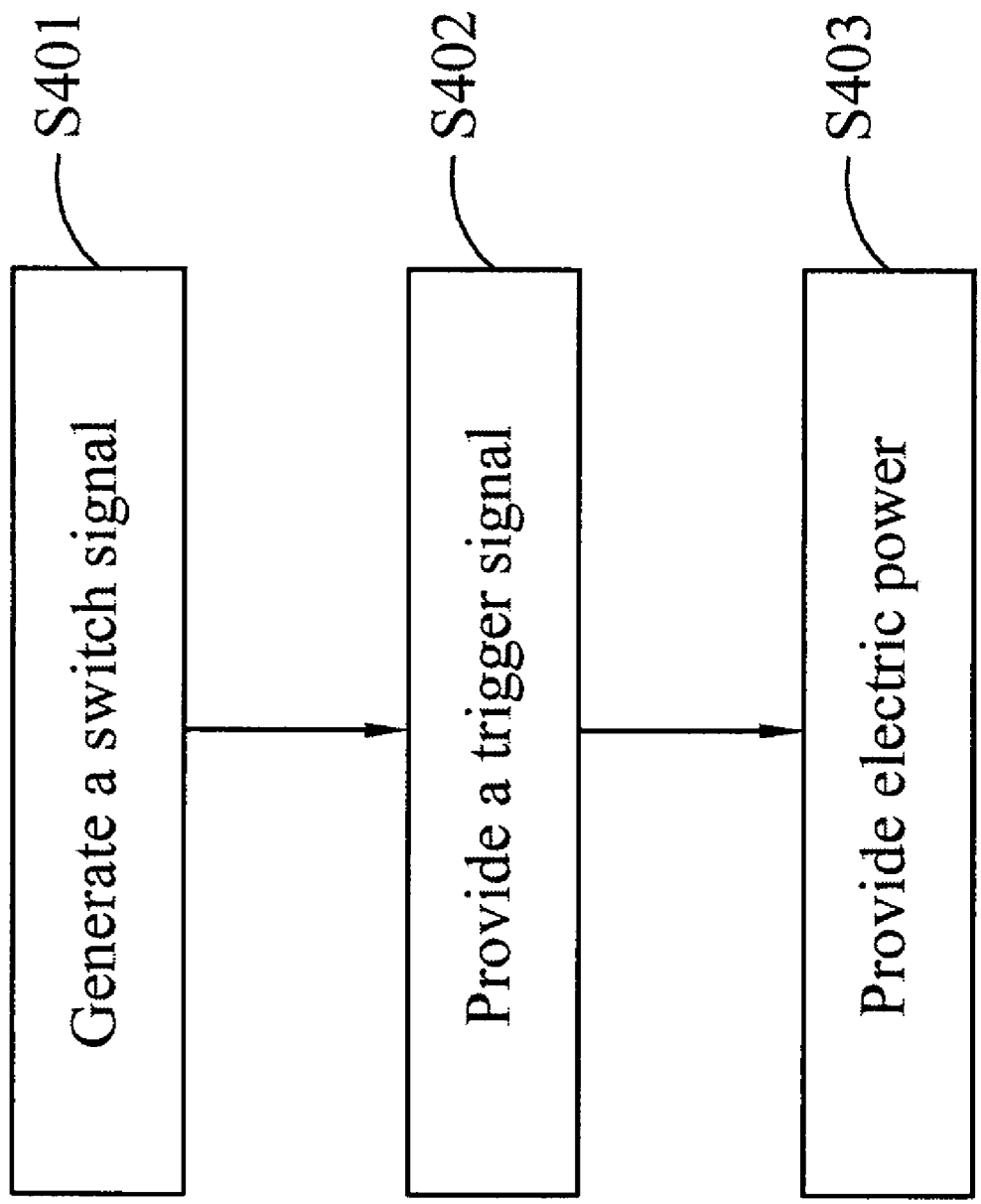
FIG. 4 is a flowchart showing the steps included in a first control method applicable to the electronic device of the present invention for controlling an external power supply device connected to the electronic device.

Please refer to FIG. 4, which is a flowchart showing the steps included in a first control method applicable to the electronic device 1 of the present invention for controlling an external power supply device 5. The electronic device 1 has an internal power module 3, and is electrically connected to the external power supply device 5, which can be switched between an ON state and an OFF state. The first control method includes the following steps:

Step S401: Generating a switch signal 21. The switch signal 21 is generated by a switch module 2 on the electronic device 1 when the switch module 2 is triggered.

Step S402: Providing a trigger signal 31. The internal power module 3 receives the switch signal 21 and accordingly generates a trigger signal 31 to the external power supply device 5.

Step S403: Providing electric power 51. When the external power supply device 5 receives the trigger signal 31, it is triggered to switch from the OFF state to the ON state and supplies electric power 51 to the electronic device 1.

When a user powers on the electronic device 1, according to the Step S401, the switch module 2 on the electronic device 1 is triggered and generates the switch signal 21. According to the Step S402, the internal power module 3 of the electronic device 1 receives the switch signal 21 generated in the Step S401, and accordingly generates the trigger signal 31 to the external power supply device 5. In the Step S402, there can be further included a limiting step and a signal-maintaining step. In the limiting step, a limiting module 7 of the electronic device 1 lowers the signal level of the trigger signal 31 generated in the Step S402. In the signal-maintaining step, a signal-maintaining module 6 of the electronic device 1 extends the level conversion section of the trigger signal 31 generated in the Step S402. According to the Step S403, when the external power supply device 5 receives the trigger signal 31, it is triggered to switch from the OFF state to the ON state and accordingly, supplies electric power 51 to the electronic device 1. After the Step S403, there can be further included a control step, in which a control module 4 of the electronic device 1 receives the electric power 51 supplied by the external power supply device 5 within the level conversion section in the Step S403 as well as the switch signal 21 generated in the Step S401, and accordingly generate a control signal 41 to the external power supply device 5 to control the ON/OFF state of the external power supply device 5. Moreover, before the control module 4 receives the switch signal 21 generated in the Step S401, a delay step can be further included, in which the switch signal 21 is delayed by a predetermined period of time via a delay module 8 of the electronic device 1 before the switch signal 21 is sent to the control module 4.

Figure 5:
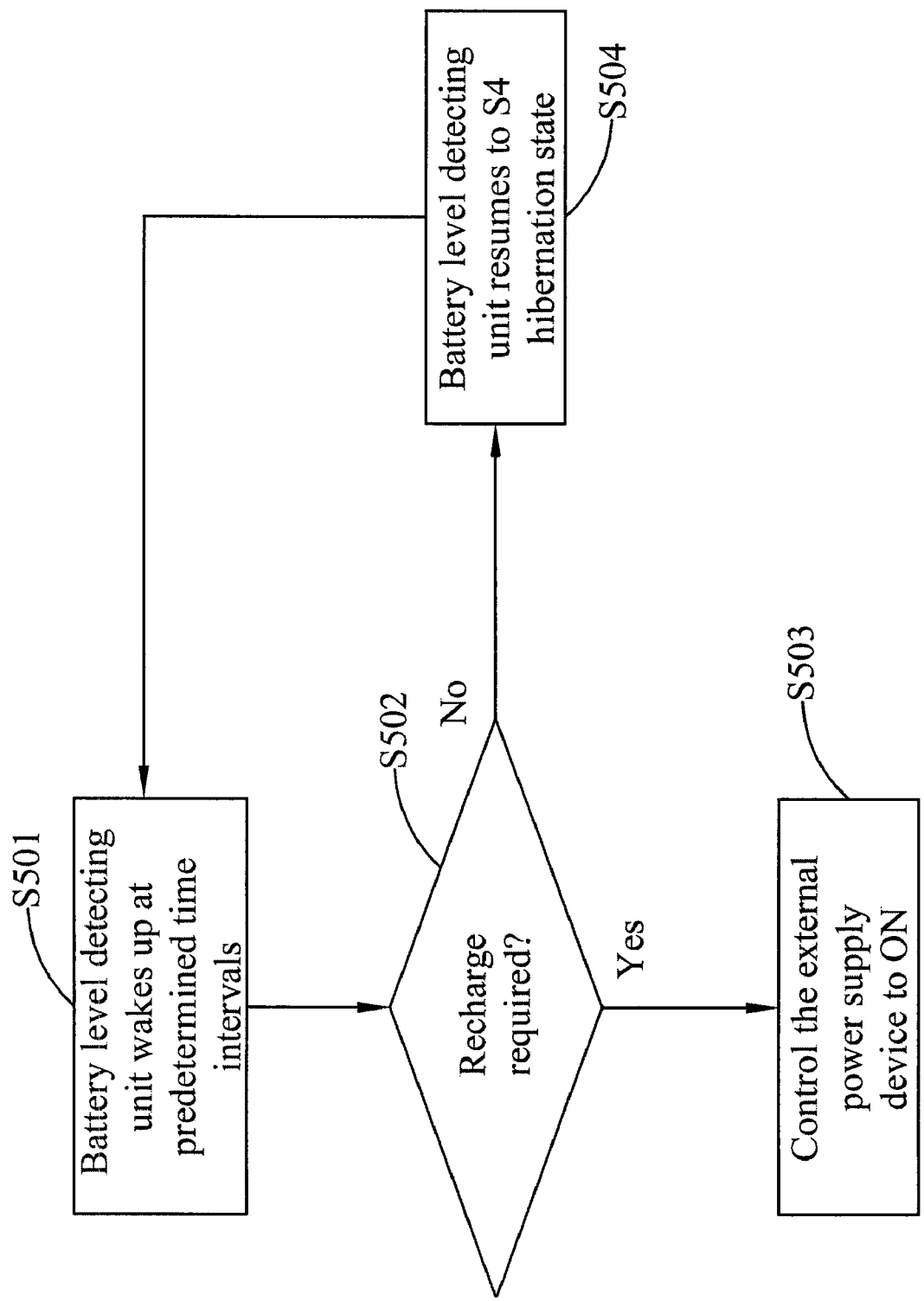
FIG. 5 is a flowchart showing the steps included in a second control method applicable to the electronic device of the present invention for controlling an external power supply device connected to the electronic device.

In the present invention, in addition to controlling the external power supply device 5 via the switch signal 21 generated in the Step S401, the ON/OFF state of the external power supply device 5 can be otherwise controlled according to the remaining battery power of the internal power module 3. FIG. 5 is a flowchart showing the steps included in a second control method applicable to the electronic device 1 of the present invention for controlling the external power supply device 5 connected thereto. Please refer to FIG. 5. The second control method includes the following steps:

Step S501: Waking up a battery level detecting unit 42 in the control module 4 at predetermined time intervals.

Step S502: Determining the remaining battery power of the internal power module 3. In the case the remaining battery power is lower than a preset low limit, go to the following Step S503; or if the remaining battery power is higher than a preset high limit, go to the following Step S504.

Step S503: Controlling the external power supply device 5 to the ON state, so that the internal power module 3 is recharged.

Step S504: The control module 4 resumes to an S4 hibernation state again.

Figure 6:
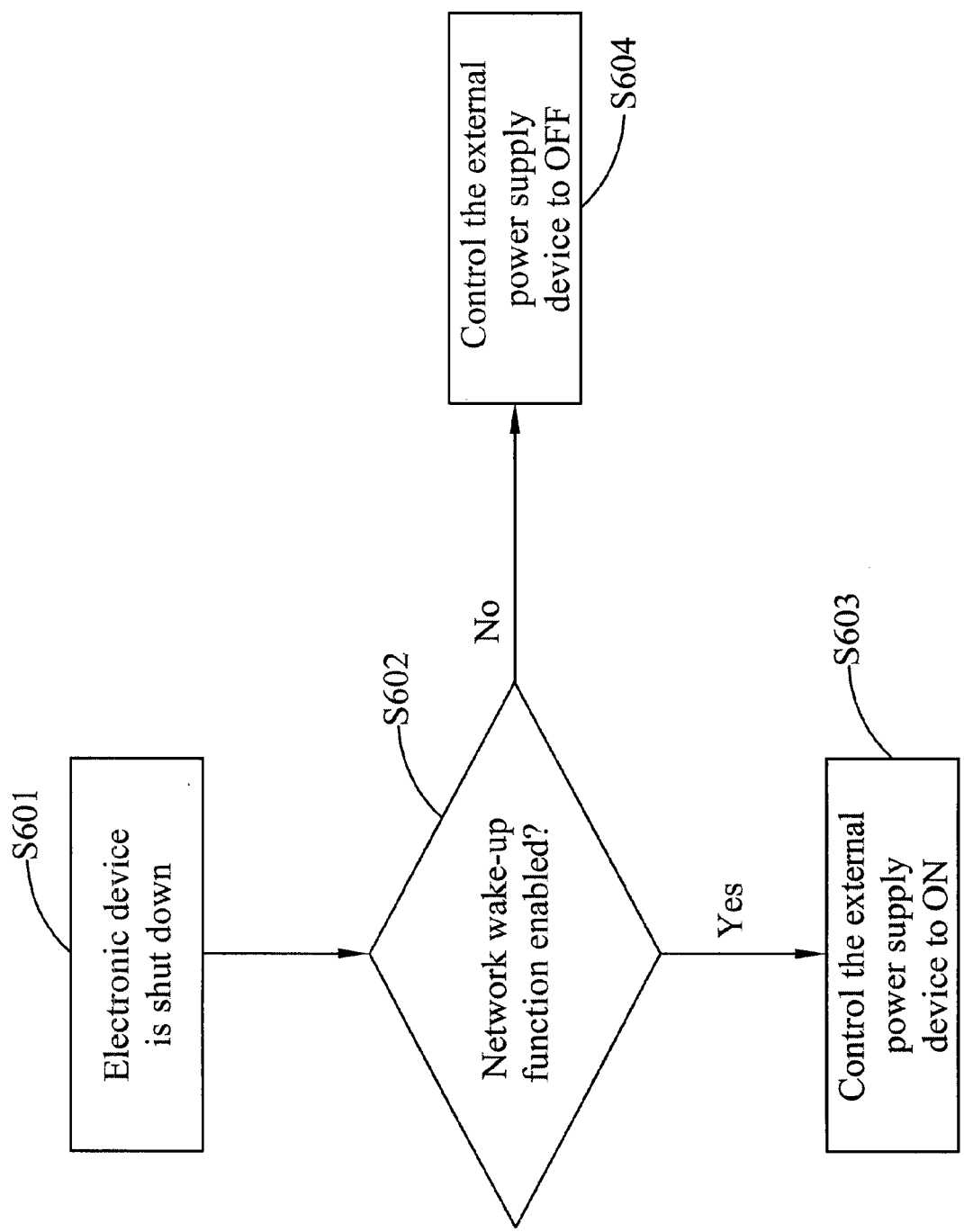
FIG. 6 is a flowchart showing the steps included in a third control method applicable to the electronic device of the present invention for controlling an external power supply device connected to the electronic device.

According to the present invention, the ON/OFF state of the external power supply device 5 can also be otherwise controlled according to whether a network wake-up function is currently enabled or not. FIG. 6 is a flowchart showing the steps included in a third control method applicable to the electronic device 1 of the present invention for controlling the external power supply device 5 connected thereto. Please refer to FIG. 6. The third control method includes the following steps:

Step S601: The electronic device 1 is in the power-off state.

Step S602: The control module 4 determining whether a network wake-up module 9 in the electronic device 1 is currently enabled to perform a network wake-up function. If yes, go to the following Step S603; or if no, go to the following Step S604.

Step S603: Controlling the external power supply device 5 to the ON state.

Step S604: Controlling the external power supply device 5 to the OFF state.

According to the electronic device 1 and the external power supply device control method of the present invention, when the external power supply device 5 is in an OFF state and does not supply electric power, the electronic device 1 can use the internal power module 3 thereof to supply the electric power needed to switch the external power supply device 5 to the ON state; and the control module 4 in the electronic device 1 can serve as a power management device to control the ON/OFF state of the external power supply device 5 according to the switch signal 21, whether the internal power module needs to be recharged, and whether the network wake-up function is currently enabled.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An electronic device being electrically connected to an external power supply device, the external power supply device being able to switch between an ON state and an OFF state, the electronic device comprising:
    a switch module generating a switch signal while being triggered; and
    an internal power module receiving the switch signal to accordingly generate a trigger signal to the external power supply device and the external power supply device being triggered to switch from the OFF state to the ON state and accordingly supplying electric power to the electronic device.

2. The electronic device as claimed in claim 1, wherein the electronic device is electrically connected to the external power supply device via a power cable or via wireless transmission.

3. The electronic device as claimed in claim 1, wherein the switch signal generated by the triggered switch module comprises a level conversion section.

4. The electronic device as claimed in claim 3, wherein the trigger signal triggers the external power supply device to supply the electric power within the level conversion section.

5. The electronic device as claimed in claim 4, further comprising a signal-maintaining module, the signal-maintaining module being electrically connected between the internal power module and the external power supply device for extending the level conversion section of the trigger signal.

6. The electronic device as claimed in claim 4, further comprising a control module, the control module receiving the electric power supplied within the level conversion section as well as the switch signal, and accordingly generating a control signal to the external power supply device for controlling the ON/OFF state of the external power supply device.

7. The electronic device as claimed in claim 6, further comprising a delay module electrically connected between the switch module and the control module, the delay module receiving the switch signal generated by the switch module and delaying the received switch signal by a predetermined period of time before sending the switch signal to the control module.

8. The electronic device as claimed in claim 6, wherein the control module further includes a battery level detecting unit for detecting a remaining battery power of the internal power module at predetermined time intervals, so as to control the ON/OFF state of the external power supply device according to the detected battery level and whether the internal power module should be recharged or not.

9. The electronic device as claimed in claim 6, further comprising a network wake-up module electrically connected to the control module, and the control module determining whether the network wake-up module is currently enabled and controlling the ON/OFF state of the external power supply device according to a result from the determination.

10. The electronic device as claimed in claim 1, further comprising a limiting module, the limiting module being electrically connected between the internal power module and the external power supply device for lowering a signal level of the trigger signal.

11. An external power supply device control method applicable to an electronic device having an internal power module, the electronic device being electrically connected to an external power supply device, and the external power supply device being able to be switched between an ON state and an OFF state, the control method comprising the following steps:
   generating a switch signal by a switch module on the electronic device while the switch module is triggered;
   providing a trigger signal to the external power supply device by the internal power module while receiving the switch signal; and
   providing electric power to the electronic device by the external power supply device while receiving the trigger signal and being triggered to switch from the OFF state to the ON state.

12. The external power supply device control method as claimed in claim 11, wherein the electronic device is electrically connected to the external power supply device via a power cable or via wireless transmission.

13. The external power supply device control method as claimed in claim 11, wherein the switch signal generated by the triggered switch module comprises a level conversion section.

14. The external power supply device control method as claimed in claim 13, wherein the trigger signal triggers the external power supply device to supply the electric power within the level conversion section.

15. The external power supply device control method as claimed in claim 14, further comprising a signal-maintaining step for extending the level conversion section by a signal-maintaining module of the electronic device.

16. The external power supply device control method as claimed in claim 14, further comprising a control step, in which a control module of the electronic device receives the electric power supplied within the level conversion section as well as the switch signal, and accordingly generates a control signal to the external power supply device for controlling the ON/OFF state of the external power supply device.

17. The external power supply device control method as claimed in claim 16, further comprising a delaying step for delaying the switch signal for a predetermined period of time before sending the switch signal to the control module by a delay module of the electronic device.

18. The external power supply device control method as claimed in claim 16, further comprising a battery level detecting step, in which a battery level detecting unit in the control module detects a remaining battery power of the internal power module at predetermined time intervals, so that the control module controls the ON/OFF state of the external power supply device according to the detected battery level and whether the internal power module should be recharged or not.

19. The external power supply device control method as claimed in claim 16, further comprising a determining step, in which, when the electronic device is shut down, the control module determines whether a network wake-up function is currently enabled on the electronic device, and controls the ON/OFF state of the external power supply device according to a result from the determination.

20. The external power supply device control method as claimed in claim 11, further comprising a limiting step for lowering the signal level of the trigger signal by a limiting module of the electronic device.

* * * * *